United States Patent
Bass et al.

(10) Patent No.: US 6,623,167 B2
(45) Date of Patent: Sep. 23, 2003

(54) ARRANGEMENT FOR CLAMPING INNER BEARING RACE TO NON-CIRCULAR SECTION SHAFT AND FOR PREVENTING AXIAL LOAD IN THE BEARING, AXIAL CREEP AND ROTATIONAL KNOCK

(75) Inventors: Merlyn Duane Bass, Ottumwa, IA (US); Henry Dennis Anstey, Ottumwa, IA (US); Shawn Wayne Poggemiller, Ottumwa, IA (US); William Albert Ardueser, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/848,084

(22) Filed: May 3, 2001

(65) Prior Publication Data

US 2002/0164101 A1 Nov. 7, 2002

(51) Int. Cl.[7] .................................. F16C 19/06
(52) U.S. Cl. ...................................... 384/537
(58) Field of Search ................. 384/906, 557, 384/542, 537, 544, 585

(56) References Cited

U.S. PATENT DOCUMENTS

| | | | |
|---|---|---|---|
| 1,889,064 A | 11/1932 | Dunham | |
| 4,502,738 A * | 3/1985 | Nauta | 384/477 |
| 5,448,944 A | 9/1995 | Line et al. | |
| 5,482,383 A | 1/1996 | Gantt et al. | 384/513 |
| 5,584,584 A | 12/1996 | Line et al. | 384/537 |
| 5,660,484 A | 8/1997 | Peel | 384/539 |
| 6,250,815 B1 * | 6/2001 | Picone et al. | 384/557 |

* cited by examiner

Primary Examiner—Lenard A. Footland

(57) ABSTRACT

Each end of a roller is defined by a stub shaft that is non-circular in cross section and supported from a side wall for rotation by a ball bearing having an inner race containing a mounting hole that is shaped complementary to, and located on, the stub shaft. The inner race is clamped from moving axially or radially relative to the shaft, thereby preventing the bearing from knocking against the stub shaft during operation. According to one embodiment of the invention, the outer race of the bearing is mounted within a complementary shaped bore of a sleeve that has a cylindrical exterior surface and is, in turn, mounted for axial movement in a cylindrical bore of a bearing housing that is mounted to the side wall by the agency of a bearing support. According to a second embodiment of the invention, the outer race of the bearing in mounted within a complementary shaped bore of a bearing housing which is, in turn, mounted to the side wall by the agency of a bearing support that is designed to flex axially while maintaining radial strength. Both embodiments thus limit the axial load which is transmitted between the shaft and the side wall by means of the bearing.

20 Claims, 3 Drawing Sheets

ARRANGEMENT FOR CLAMPING INNER BEARING RACE TO NON-CIRCULAR SECTION SHAFT AND FOR PREVENTING AXIAL LOAD IN THE BEARING, AXIAL CREEP AND ROTATIONAL KNOCK

FIELD OF THE INVENTION

The present invention relates to bearing and shaft assemblies and more specifically relates to shafting having a non-circular cross section which is received in bearings having an inner race provided with a matching shaped opening receiving the shaft.

BACKGROUND OF THE INVENTION

On known machines, agricultural balers for making large round bales, for example, non-circular section shafting has been used to provide stub shafts or end-shafts in live-shaft rollers. The live-rollers can then be used for providing input and output torque drives without requiring secondary shaft finishing operations such as spline hobbing, etc. (for example, see U.S. Pat. No. 5,448,944, granted to Line et al.), and to address the many shortcomings of using bearings with eccentric locking collars on round shafts. However, there is a continuing issue with two phenomena at the joints between these shafts and bearings, namely: (a) rotational knock and (b) axial creep.

Rotational knock, as concerns shafting having a multi-facet cross section, is a result of excessive clearance between the across-flats dimension on the shaft and the bearing bore. Rotation of the shaft causes the shaft flats to shift in reaction to the load resultant, and if sufficient clearance exists, an audible knocking noise is perceived. This can be amplified by adjacent structural or surrounding metal shielding to the extent that it is objectionable to customers or passersby. Negative impressions of the machine can result, and, while it is not known whether premature bearing failure might result, there is no doubt that in extreme cases continued sliding of the loose fit during operation will result in wear further increasing the clearance and eventually requiring the replacement of either the bearing, or the shaft, or both.

Axial creep is due to a combination of clearance between the across-flats dimension of the shaft and bearing bore, along with some angularity or non-parallelism existing between the axis of the shaft and the bearing axis. Rotating the shaft under these conditions can cause the shaft to incrementally crawl or creep with each successive bearing flat as it is encountered. The result of this situation is that axial loading will be conveyed to the bearing. In the case of ball bearings, which are not designed to withstand substantial axial loads, the service life of the bearing may be shortened. Also, there can be sufficient axial force generated by this phenomenon that structural members can be flexed through repeated cycles to the point of causing fatigue failures. There can also be objectionable slamming noise caused when the unit is shut off, which releases the torque in the system, and the friction is broken at that point, allowing the supporting members to return to their original positions.

Currently, the above problems encountered with non-circular section shaft and bearing combinations are addressed by closely controlling the dimensions on the shaft and bearing bores so as to limit the clearances involved, and to use a chemical compound during the assembly process for filling the remaining clearance with a resilient material. The successful combination of controlling clearances together with using a chemical compound has had mixed results. Due to random combinations of parts, it has been demonstrated that fits will occur which result in gaps that are beyond the capability of the chemical compound. Continuing efforts to achieve closer tolerance controls have not proved successful and it appears that significant cost increases would be required to guarantee closer tolerances. Furthermore, even if the tolerances are kept within those with which the chemical compound will be effective, other issues arise. First, the cleanliness of the shaft and the bearing at the joint is critical to getting the chemical compound to harden as the ions of the cleaned metal are a catalyst in the process. Second, application of the chemical compound onto the shaft, and then installing the bearing onto the shaft tends to wipe the bulk of the compound off the shaft so it is not available in the formed joint. This is wasteful, and makes the process ineffective. Third, a good joint is difficult to separate for the purposes of service, e.g., when a bearing needs to be replaced. Last, some individuals are sensitive to the chemical compound and may develop a skin rash if they come into contact with the compound. Thus, protective equipment and extra care is required to avoid coming into contact with the chemical compound.

SUMMARY OF THE INVENTION

According to the present invention there is provided an improved shaft and bearing combination.

An object of the invention is to provide a shaft and bearing combination which does not require close tolerances and/or a chemical compound to eliminate rotational knock and/or axial creep.

A more specific object of the invention is to provide a combined shaft and bearing combination wherein the inner race of the bearing is clamped so as to prevent it from undergoing radial movement, thereby eliminating rotational knock. Specifically, the clamping is effected by using a fastening device, such as a bolt in the end of the shaft or a nut on the end of the shaft, to provide the clamping action on a properly selected stack-up of washers and/or shims, the bearing and/or spacers and/or shaft length.

Yet another object of the invention is to provide a combined shaft and bearing combination, as set forth in the immediately preceding object, wherein the bearing is mounted for axial movement so axial loading of the bearing during assembly or operation is avoided. In accordance with a first embodiment, this object is achieved by mounting the bearing to a carrier that is mounted to a fixed bearing support for some axial movement relative to the support. In accordance with a second embodiment, the carrier is eliminated and the bearing is mounted in a housing mounted to a bearing mounting plate or support that is strong in the plane which is perpendicular to the shaft, but is relatively soft, and able to flex in the axial direction of the shaft, thereby limiting the axial load which is transmitted between the shaft and the frame, via the bearing.

These and other objects will become apparent from a reading of the ensuing description together with the appended drawings.

DESCRIPTION OF THE PREFERRED EMBODIMENT

Figure 1:
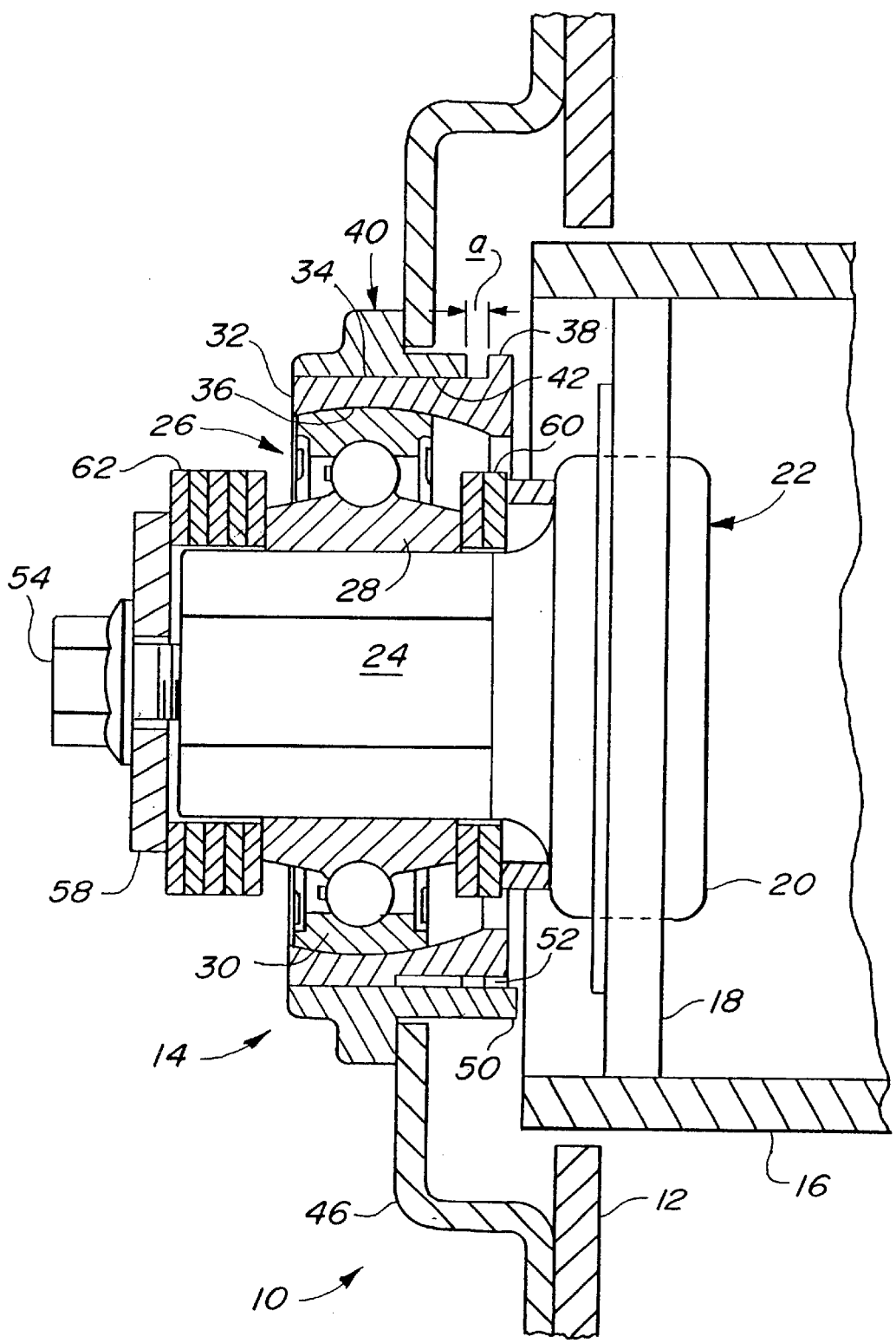
FIG. 1 is a vertical sectional view taken along the axis of a roller assembly including an installation of a typical non-circular section shaft and mating ball bearing in accordance with a first embodiment of the present invention.

Referring now to FIG. 1, there is shown one end of a roller assembly 10 supported for rotation from a machine side wall 12 by a bearing assembly 14. While the present invention is applicable to any machine utilizing a driven non-circular shaft received in a mating opening provided in the inner race of a roller bearing so as to be supported for rotation, the roller assembly 10 disclosed here is typical of a type used for supporting the bale-forming belts of a large cylindrical baler. Specifically, the roller assembly 10 includes a hollow cylindrical tube 16 having a circular ring-like plate 18 received a short distance within one end thereof and having its outside diameter welded or otherwise fixed to the inside thereof, and with the inside diameter of the plate 18 being joined to an enlarged inner cylindrical section 20 of a stub shaft 22 having a remaining section 24 that is non-circular, in this example, being shown as hexagonal, in cross section. It is to be understood that the other end of the roller assembly 10 may be similarly constructed or that, instead of stub shafts, a single non-circular section shaft may extend axially through, and be fixed by supports to the interior of, the tube 16.

Figure 2:
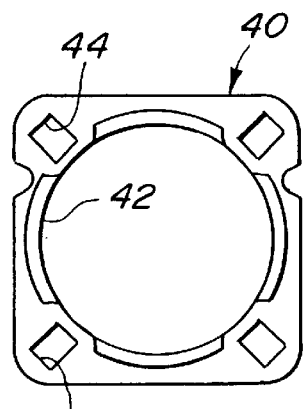
FIG. 2 is a left side view of the bearing housing of the installation shown in FIG. 1.
Figure 4:
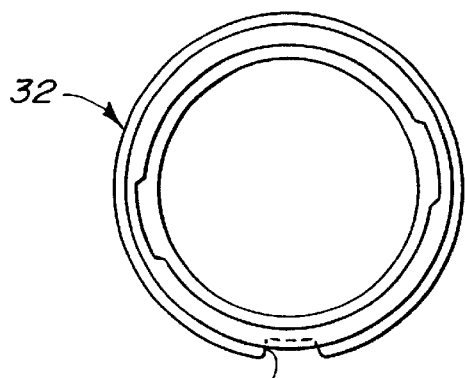
FIG. 4 is a left side view of the spherical bearing sleeve of the installation shown in FIG. 1
Figure 3:
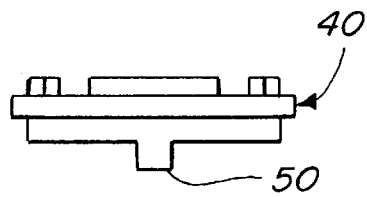
FIG. 3 is a bottom view of the bearing housing shown in FIG. 2.

Located on the hex section 24 of the stub shaft 22 is a ball bearing 26 having an inner race 28, that is provided with a bore of hexagonal cross section, and an outer race 30 that has a spherically shaped outer surface. A bearing sleeve 32 for the roller bearing 26 includes a cylindrical outer surface 34 and a spherical inner surface 36, the latter being in engagement with the cylindrical surface of the outer bearing race 28. An annular rim or shoulder 38 is provided at the inner or right end of the sleeve 32 and extends radially outward from the outer surface 34. A bearing housing 40 having a substantially square outline, as viewed from the side in FIG. 2, contains a cylindrical bore 42 in which the sleeve 32 is slidably received for some axial movement, having a purpose described below. The four corners of the bearing housing 40 are each provided with a mounting hole 44 (FIG. 2) which receives a bolt (not shown) that acts together with a nut to clamp the housing 40 to a bearing support bracket 46 that is in turn fixed, as by bolting (not shown) to the implement side wall 12. Referring now also to FIGS. 3 and 4, it can be seen that the bottom of the bearing housing 40 is provided with an axially inward extending tab or tang 50 that is received in a slot 52 extending axially through the rim or shoulder 38 and partly into the body of the bearing sleeve 32. Thus, relative rotation between the bearing sleeve 32 and the bearing housing 40 is prevented, ensuring that rotation is forced to occur within the bearing 26, thereby preventing premature wear.

To ensure that there is no relative movement between the stub shaft 22 and the inner race 28 of the roller bearing 26 so as to prevent any knocking sound from being generated between the hex flats of the stub shaft section 24 and those of the inner bearing race, an assembly is provided for clamping the inner race 28 to the stub shaft 22. Specifically, a flanged head cap screw 54 is screwed into a threaded bore extending axially into the stub shaft 22 from an outer end of the hex section 24. A ring-like spacer 56 and a washer 58 are respectively provided on the stub shaft 22, at the juncture between the sections 20 and 24, and on the cap screw 54 at the flanged head. Obviously, in lieu of the cap screw 54, the end of the stub shaft 22 could be threaded and a nut received thereon to provide the clamping force. In any event, a first stack of shims 60 is sandwiched between the spacer 56 and an inner or right end of the inner race 28, while a second stack of shims 62 is sandwiched between the washer 58 and an outer or left end of the inner bearing race 28. The opposite end of the roller assembly 10 is supported in a bearing having its inner race clamped in a manner similar to that just described for clamping the inner bearing race 28 of the bearing 26.

Because the ball bearing 26 is a type which is designed to carry primarily a radial load, but is not designed to withstand substantial axial load, it is necessary to make accommodation for axial loads, some of which might result from the clamping operation itself if the installer makes a poor selection of washers and/or shims. It is to be noted that the sleeve 32 and bearing housing 40 are designed such that when an installer has correctly arranged the spacer 56, washer 58 and stacks of shims 60 and 62, the outer ends of both the sleeve 32 and bearing housing 40 will lie in the same vertical plane perpendicular to the stub shaft 22, with the bearing 26 then being centered beneath the thickest section, and hence the strongest part, of the bearing housing 40, as shown in FIG. 1. In any event, accommodation for axial loading is accomplished by way of the slip fit between the sleeve 32 and the bearing housing 40, as above described. Specifically, as can be seen in FIG. 1, a small gap a (approximately 10 mm in one practical example) is defined between the rim or shoulder 38 of the bearing sleeve 32 and an inner or right surface of the bearing housing 40. This permits the roller assembly 10 to undergo axial movement without transferring any axial load to the bearing 26. There is no need for such a slip fit to be incorporated into the mounting for the bearing at the other end of the roller assembly 10.

Figure 7:
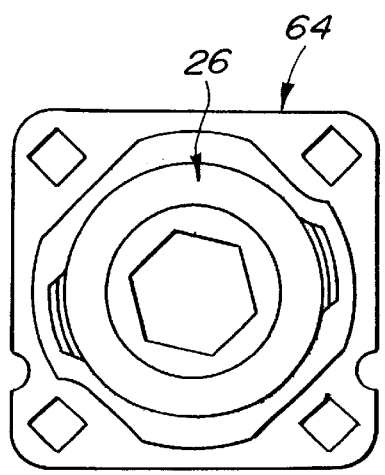
FIG. 7 is a left side view of the ball bearing with its housing as shown in the installation illustrated in FIG. 6.
Figure 8:
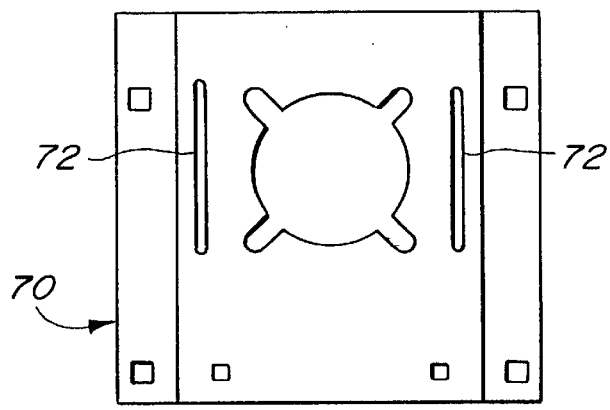
FIG. 8 is a left side view of the bearing mounting plate of the installation illustrated in FIG. 6.
Figure 6:
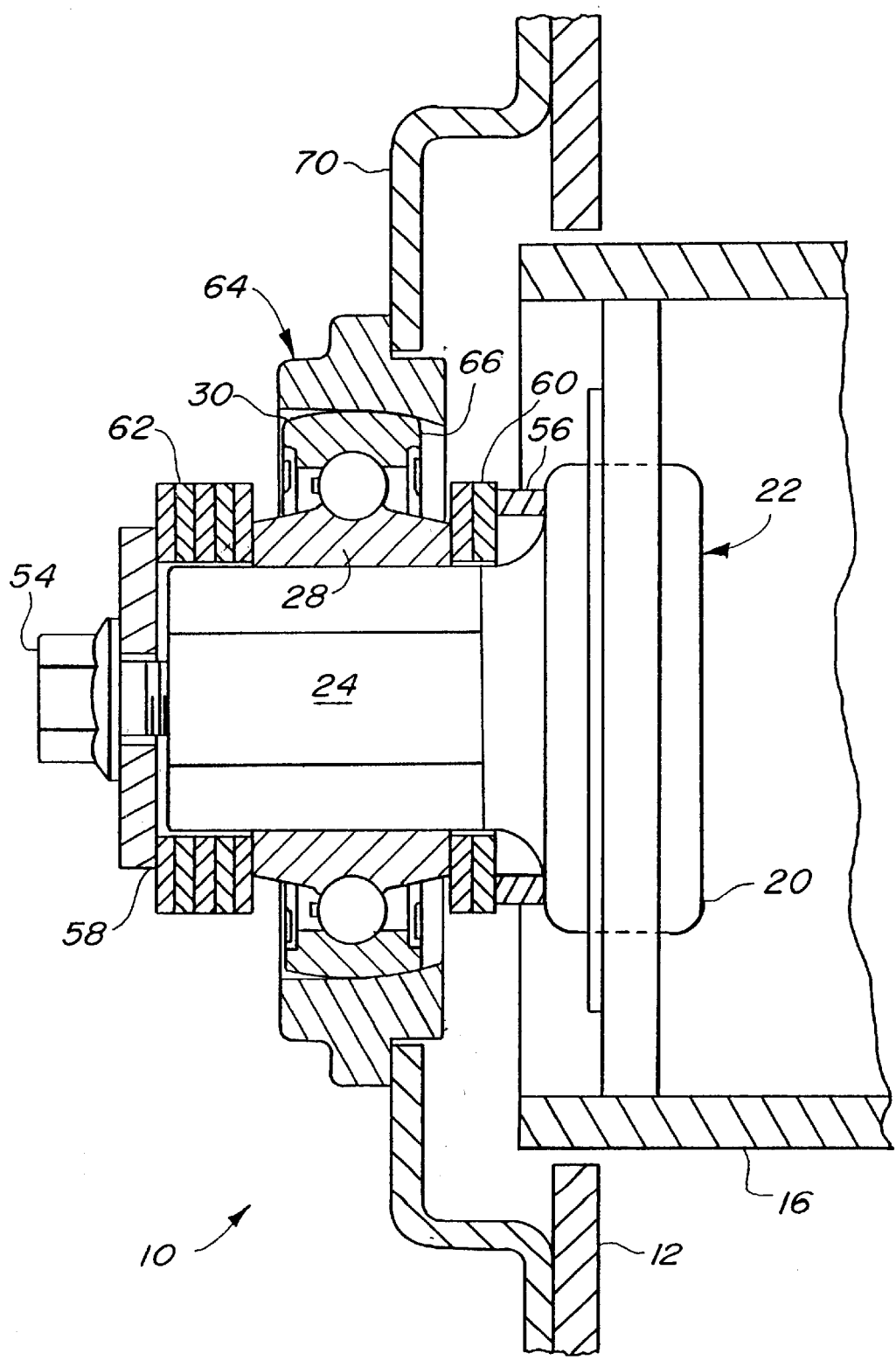
FIG. 6 is a view similar to that of FIG. 1 but showing a second embodiment of the invention.

Referring now to FIGS. 6 and 7, there is shown a lower cost alternative for permitting axial movement of the roller assembly 10 so as to prevent undue axial loading of the bearing 26, with structure common to that of the embodiment disclosed in FIG. 1 being designated by the same reference numeral call outs. Specifically, it can be seen that in lieu of the bearing sleeve 32 and bearing housing 40, there is provided a bearing housing 64 having a spherical surface 66 engaged with the spherical surface of the outer race 30 of the bearing 26. The bearing housing 64 is square in outline, as can be seen in FIG. 7, and a mounting hole 68 is provided at each of its four corners for receiving bolts (not shown) which cooperate with nuts to secure the bearing housing 64 to a bearing support bracket 70. The bearing support bracket 70 is, in turn, bolted to the side wall 12.

Figure 5:
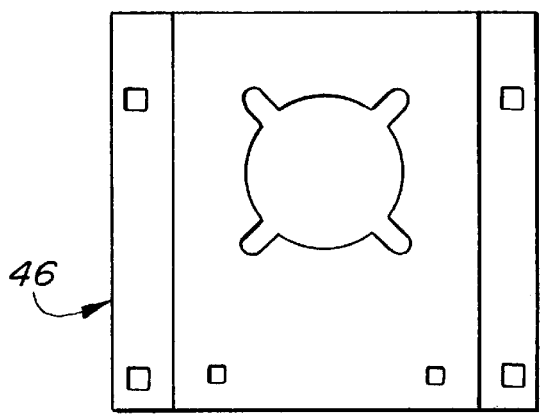
FIG. 5 is a left side view of the bearing mounting plate of the installation shown in FIG. 1.

The bearing support bracket 70 is here shown as being identical to the bearing support bracket 46 illustrated in FIG. 5 except for the provision of vertically elongated openings 72 located one each at the opposite sides of the mounting region for the bearing housing 64. These elongated openings 72 serve to permit the bearing support bracket 70 to flex axially while not adversely affecting the radial load capacity of the bearing support bracket 70. Obviously, any bearing support which exhibits the requisite axial flexing characteristic while maintaining sufficient strength to withstand the designed radial loads could be used without departing from the scope of the invention. For example, different numbers of openings, opening shapes and placement could be used as well as supports having sections of varying thickness. One additional design criteria is that there has to be sufficient stress relief such that fatigue failures do not result from the flexing.

The operation of the invention is thought evident from the foregoing description, and for the sake of brevity, is not restated here. Suffice it to say, that by clamping the inner race 28 of the roller bearing 26 to the non-circular section 24 of the stub shaft 22, sensitivity of the fit of the shaft section to the mating bore of the inner race 28 is reduced, while movement between the two parts and attendant knocking and creeping caused by them colliding and interacting with each other, is prevented. Furthermore, the slip fit between the bearing sleeve 32 and bearing housing 40, in the first embodiment, and the axially flexible bearing support bracket 70 of the second embodiment, prevent undue axial loading of the ball bearings 26 at the opposite ends of the roller assembly 10. In addition, the design is tolerant of assemblers or service technicians who might inadvertently mismatch the stack-up of spacers, shims and washers, or the like. Additionally, because there is no need to use a chemical compound to fill the clearance between the opposed surfaces of the bearing and shaft, the bearing 26 can easily be removed from the shaft 22 for service, and the health issues attendant, with the use of the chemical compound, are avoided.

Having described the preferred embodiment, it will become apparent that various modifications can be made without departing from the scope of the invention as defined in the accompanying claims.

What is claimed is:

1. In a combination of a shaft having a bearing mounting portion of non-circular cross section and of a bearing having inner race and outer races disposed on opposite sides of rotating elements with said inner race being provided with an opening mating with, and received on, said non-circular cross section of said shaft, the improvement comprising: a clamping assembly acting between said shaft and opposite sides of said inner race of said bearing for preventing said inner race from moving either axially or radially relative to said shaft; said clamping assembly including a threaded element coupled to, and moveable relative to, an end of said shaft; said threaded element having an axially inwardly facing surface; a stop structure fixed to said shaft at a location on an opposite side of said inner race of said bearing from said inwardly facing surface; and said clamping assembly including at least one axial load transfer element engaged by said inwardly facing surface and acting so as to create a force transferred to said stop structure by way of said inner race of said bearing.

2. The combination as defined in claim 1 wherein said stop structure is formed by an enlarged section of said shaft.

3. The combination as defined in claim 1 wherein said at least one axial load transfer element is one of a washer or spacer; said clamping assembly further including a stack of shims extending from said one of a washer or spacer to an outer surface of said inner bearing race.

4. The combination as defined in claim 3 wherein said clamping assembly further includes one of a second stack of shims or a spacer located between an inner surface of said inner bearing race and said stop structure.

5. The combination as defined in claim 1 wherein said clamping assembly includes one of a stack of shims or a spacer located between said stop structure and an inner surface of said inner bearing race.

6. The combination as defined in claim 5 wherein said clamping assembly includes a spacer located between said stop structure and said one of said stack of shims or spacer.

7. The combination as defined in claim 1 wherein said threaded element is a flanged head set screw; said shaft end being provided with a threaded axial bore receiving said set screw; and said axially inwardly facing surface being a surface of said flanged head.

8. In a combination of a shaft having a bearing mounting portion of non-circular cross section and of a bearing having inner race and outer races disposed on opposite sides of rotating elements with said inner race being provided with an opening mating with, and received on, said non-circular cross section of said shaft, the improvement comprising: a clamping assembly acting between said shaft and opposite sides of said inner race of said bearing for preventing said inner race from moving either axially or radially relative to said shaft; said bearing being of a type whose life is reduced with substantial axial loading; said combination further including a fixed support; a bearing mounting assembly mounting said bearing to said fixed support and including a bearing supporting structure engaging said outer race and being mounted for movement a small distance axially, while maintaining radial rigidity, so as to limit the axial load which is transmitted between the shaft and said fixed support via said bearing.

9. The combination as defined in claim 8 wherein said clamping assembly includes a plurality of axial load transfer elements; and said bearing outer race and said bearing supporting structure have respective surface characteristics which are visible, and when located in a preselected disposition relative to each other, indicate that a correct selection of said axial load transfer elements has been made so that no undue axial load is being transmitted to the bearing.

10. The arrangement as defined in claim 8 wherein said bearing support bracket includes a planar plate section disposed in a plane which is perpendicular to said shaft; and said plate section being provided with openings sized, disposed and located so as to make said plate section flexible in the axial direction while maintaining radial strength.

11. The combination as defined in claim 9 wherein said respective surface characteristics are respective outer ends of said outer bearing race and bearing supporting structure; and said preselected disposition being an axial alignment of said respective outer ends.

12. The combination defined in claim 11 wherein said bearing supporting structure includes a bearing housing having an inner surface shaped complementary to and receiving an outer surface of said outer race and a radial mounting flange extending thereabout; and a bearing support being mounted between said bearing housing and said fixed support and having flexibility in the axial direction but being relatively rigid in the radial direction.

13. The combination defined in claim 11 wherein said bearing support structure includes a planar plate section secured to said radial mounting flange of said bearing housing and containing openings sized, located and oriented such that said planar plate section will flex axially, while maintaining radial rigidity.

14. The combination defined in claim 8 wherein said bearing supporting structure includes a sleeve having a cylindrical outer surface and an inner surface shaped complementary to, and engaged with an outer surface of said outer race, and a bearing housing having a cylindrical bore slidably receiving said sleeve.

15. The combination defined in claim 14 wherein said sleeve and bearing housing have cooperating interlocking surfaces which prevent relative rotational movement between them.

16. In an arrangement for mounting a shaft to a fixed frame member for rotation, wherein bearings, having inner and outer races with rotating elements therebetween, are located at opposite ends of the shaft and secured from axial movement relative thereto, the improvement comprising: a bearing support assembly being associated with each bearing, and being mounted between said outer race of an associated one of the bearings and said fixed frame member and including separate first and second components, with said first component containing a cavity receiving said associated one of the bearings and said second component being fixed to said frame for preventing axial or radial movement of said second component relative to said frame; and said second component being one of constructed so as to flex axially relative to said frame, or constructed so as to slidably receive said first component for relative axial movement so as to permit axial movement of said shaft relative to said fixed frame member, thereby limiting the axial load which is transmitted between said shaft and said fixed frame member, via the bearing.

17. The arrangement defined in claim 16 wherein said fixed frame member includes a bearing support bracket; and said second component of said bearing support assembly is a bearing housing fixed to said bearing support bracket.

18. The arrangement defined in claim 17 wherein said first component of said bearing support assembly is a sleeve having an internal bore shaped complementary to, and receiving, said outer race of the associated bearing; and said bearing housing containing a cylindrical bore receiving said sleeve for axial movement.

19. The arrangement defined in claim 18 wherein said sleeve and bearing housing have interlocking surfaces preventing relative rotation between them.

20. The arrangement as defined in claim 17 wherein said first component of said bearing support structure is a bearing housing having an internal bore shaped complementary to, and receiving, said outer race of the associated bearing; said second component being a bearing support bracket located between, and fixed to, said bearing housing and said fixed frame member; and said bearing support bracket being designed for allowing axial flexing while remaining strong in a plane perpendicular to said shaft.

* * * * *